United States Patent [19]

Babin

[11] Patent Number: 5,146,577
[45] Date of Patent: Sep. 8, 1992

[54] SERIAL DATA CIRCUIT WITH RANDOMLY-ACCESSED REGISTERS OF DIFFERENT BIT LENGTH

[75] Inventor: David C. Babin, Austin, Tex.

[73] Assignee: Motorola, Inc., Schaumburg, Ill.

[21] Appl. No.: 335,391

[22] Filed: Apr. 10, 1989

[51] Int. Cl.⁵ .................. G06F 12/04; G11C 19/28; G11C 7/00
[52] U.S. Cl. ............................. 395/425; 365/189.12; 365/236; 365/238.5; 365/219; 364/245.1; 364/247.4; 364/933.3
[58] Field of Search ... 364/200 MS File, 900 MS File; 365/189.12, 219, 238.5, 236, 239, 240; 395/425

[56] References Cited

U.S. PATENT DOCUMENTS

| | | | |
|---|---|---|---|
| 3,882,470 | 5/1975 | Hunter | 365/900 |
| 4,639,894 | 1/1987 | Ishii | 365/219 |
| 4,686,691 | 8/1987 | Deal et al. | 365/219 |
| 4,747,081 | 5/1988 | Heilveil et al. | 365/219 |
| 4,802,133 | 1/1989 | Kanuma et al. | 365/189.12 |
| 5,042,014 | 8/1991 | Pinkham et al. | 365/236 |

*Primary Examiner*—Glenn Gossage
*Attorney, Agent, or Firm*—Robert L. King

[57] ABSTRACT

An integrated circuit with a serial data port includes a counter for counting clock pulses and generating a binary signal, a decoder for converting the binary signal to a load signal to access an appropriately sized register, a serial-in, parallel-out shift register for receiving serial data and outputting the data in parallel, and a plurality of registers. The registers receive the load signal from the decoder and have a multi-bit data input for receiving the parallel data from the shift register. The circuit can access an appropriately sized register by using the counter and the decoder instead of address bits, and therefore reduce the total bit stream length. The circuit can randomly select any register out of several registers having different bit lengths.

6 Claims, 2 Drawing Sheets

SERIAL DATA CIRCUIT WITH RANDOMLY-ACCESSED REGISTERS OF DIFFERENT BIT LENGTH

FIELD OF THE INVENTION

The present invention relates, in general, to circuits with a serial data port for receiving serial data and loading such data into a selected register. More particularly, the invention relates to such circuits which can access a predetermined register by using logic circuitry not requiring address bits.

BACKGROUND OF THE INVENTION

Conventional integrated circuits, with a serial data port for loading data into an adequate register, require an address bit stream in addition to a data bit stream to steer the data to the adequate register among several registers. For example, in order to randomly access one of five registers, three address bits are required. If data to be loaded has an eight-bit length, a total of a least 11 bits is needed in the bit stream. This means that it takes an undesirably long time to load data into registers in the prior art integrated circuits. Besides the length of the 11-bit stream is very awkward for 8-bit and 16-bit microprocessors to handle. In order to transmit the 11-bit data, the use of a 16-bit (two bytes) data stream may be required, especially with serial peripheral interfaces (SPI). In this case, each 16-bit data stream includes a 5-bit useless stream (overhead), and that makes it unnecessarily harder to write a program. And, of course, it takes much more time to load data. In the case of loading 16-bit length data into one-of-five registers, a total of at least 19-bits is needed in the bit stream. Therefore, the use of a long 24-bit (three bytes) data stream may be required. Such long data streams may require too much time to transfer data in many applications.

SUMMARY OF THE INVENTION

Accordingly, it is an object of the present invention to provide an improved serial data circuit with randomly accessed registers and an improved method for selectively storing serial data.

Another object of the present invention is to provide a circuit having a serial data port for loading data into a predetermined storage register, without using an address bit stream.

It is a further object of the present invention to provide an improved circuit with a serial data port for loading data into a register, reducing data loading time by using a counter and a decoder instead of an address bit stream.

Yet another object of the present invention is to provide an improved circuit with a serial data port, which can easily load data into any one of several registers having different bit lengths.

Still a further object of the present invention is to provide an improved circuit with a serial data port, requiring only a data bit stream which is as long as data to be loaded, and eliminating software overhead.

These and other objects and advantages of the present invention are provided by an integrated circuit with a serial data port, for receiving serial data and loading such data into a predetermined one of several registers, the circuit having:

a counter having a clock input for receiving clock pulses, a reset input for receiving an enable signal and a multi-bit output, the counter counting the number of the clock pulses received while said enable signal is in one state, and generating a binary signal corresponding to the counted number on said multi-bit output;

a decoder having a multi-bit input coupled to the multi-bit output of the counter for receiving both the binary signal and an enable input, and having plural output lines, the decoder converting the received binary signal to a load signal on only one of the plural output lines;

a serial in, parallel-out shift register having a clock input for receiving the clock pulses, a data input and a multi-bit data output, the shift register receiving serial data through the data input, and shifting the received serial data in one direction by one bit position with each of the clock pulses, and producing parallel data on the multi-bit data output; and a plurality of registers, each having a load input for receiving the load signal from a corresponding one of the plural output lines of the decoder, and a multi-bit data input coupled to at least a part of the multi-bit data output of the shift register, whereby one of the registers may receive the load signal when the enable signal goes to another state, and may store the parallel data from the shift register.

These and other objects and advantages will be apparent to one of skill in the art from the detailed description below taken together with the drawings.

DETAILED DESCRIPTION OF THE INVENTION

Figure 1:
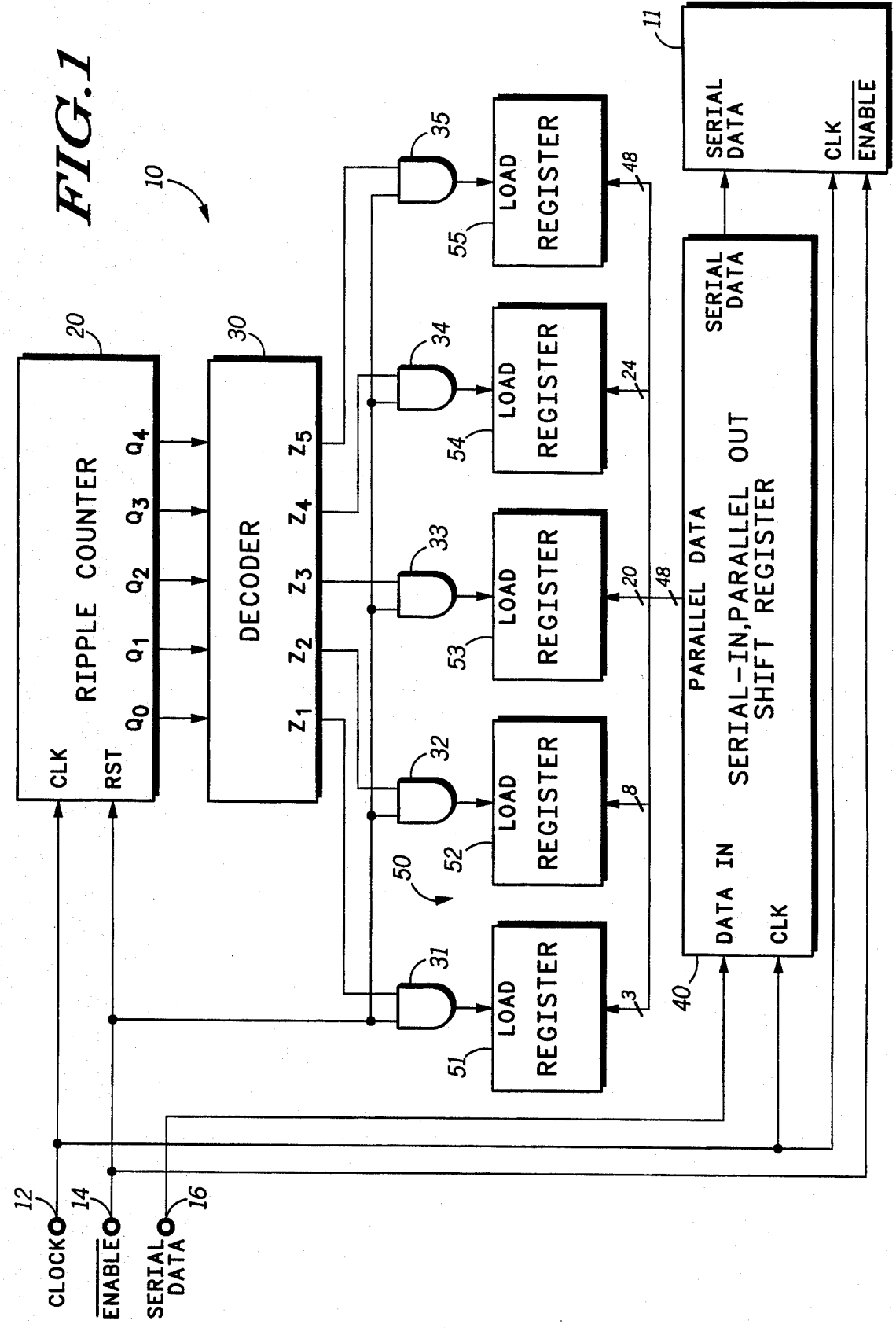
FIG. 1 is a block diagram of an integrated circuit in accordance with the present invention.

FIG. 1 illustrates a circuit 10 having a serial data port, constructed in accordance with the present invention. Circuit 10 receives serial data and loads the received data into an appropriately sized register which is selected out of several stream of varying bit size. Circuit 10 comprises a ripple counter 20, a decoder 30, a plurality of AND gates 31–35, a serial-in, parallel-out shift register 40 and a plurality of registers 50. Circuit 10 also includes a clock terminal 12, a complement enable signal input terminal (hereinafter referred to as an "enable signal terminal") 14 and a serial data port 16.

Figure 2:
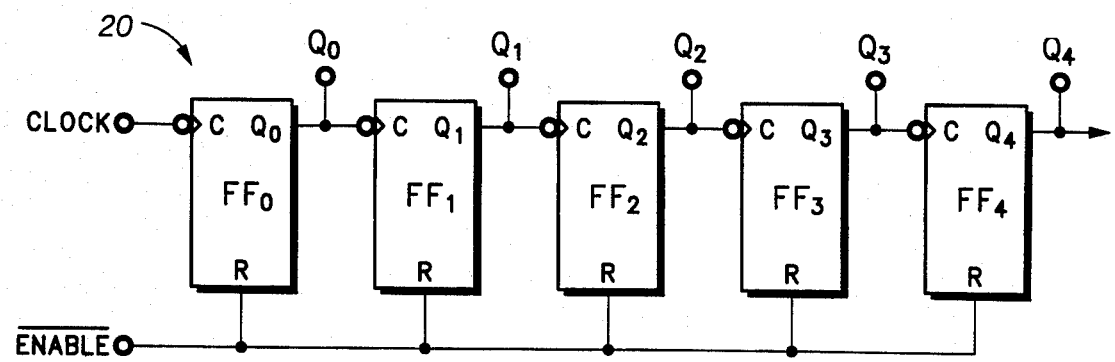
FIG. 2 illustrates in block diagram form an example of a ripple counter illustrated in the circuit of FIG. 1.

Ripple counter or counter 20 has a clock input coupled to clock terminal 12 for receiving clock pulses. Alternatively, an asynchronous counter, a synchronous binary counter, a Johnson counter, or any other counter circuit can be substituted for ripple counter 20. A signal from enable signal terminal 14 is supplied to a reset input, labeled "RST", of ripple counter 20. The signal from enable signal terminal 14 may be either a complement enable signal or a logically true enable signal. In the illustrated embodiment, the complement enable signal (hereinafter referred to just as "enable signal") is employed. Ripple counter 20 may be conventionally implemented with standard flip-flops. A block diagram of one example of ripple counter 20 is shown in FIG. 2, where five identical flip-flops FF0–FF4 are cascaded by connecting the clock and Q data outputs in series respectively and connecting the reset inputs, each labeled "R", in common. The enable signal which is provided to the enable signal terminal 14 is transmitted to the reset inputs of all the flip-flops. A clock input of the first flip-flop FF0 receives the clock pulses from clock terminal 12. An output Q0 of the first flip-flop FF0 is used as an output signal and is received by a clock input of the second flip-flop FF1. An output Q1 of the second flip-flop FF1 is also sent to a clock input of the next flip-flop FF2. The Q0 output is the least significant bit (LSB), and the Q4 output is the most significant bit (MSB). When the enable signal, i.e. the reset input, is at a logic high level, all outputs Q0–Q4 are at logic zero levels. While the enable signal is low, each flip-flop changes its state on the falling or negative-going edge of its clock input.

Figure 3:
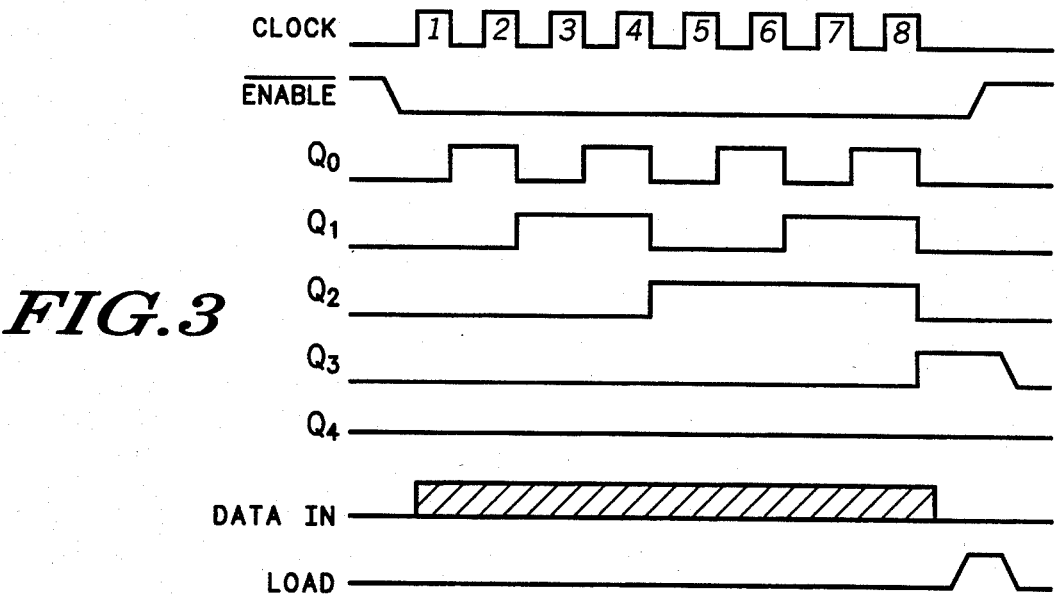
FIG. 3 is a timing diagram illustrating the timing of clock pulses, enable signal, the outputs of the ripple counter, and data associated with the circuit of FIG. 1.

A timing diagram for these flip-flops is given in FIG. 3. On the falling edge of the clock pulse 1, output Q0 of the first flip-flop FF0 goes to a logic one level, and outputs Q1–Q4 are unaffected; that is, $Q1=Q2=Q3=Q4=0$. Thus, after the first clock pulse, ripple counter 20 has a binary count of one (00001). At the end of the second clock pulse, output Q0 goes to a logic zero level and triggers output Q1, and outputs Q2–Q4 are unaffected. Hence, ripple counter 20 now has a binary count of two (00010). At the end of the clock pulse eight, outputs Q0 and Q1 go to a zero logic level, and output Q2 also goes to a zero logic level and triggers output Q3. Thus, ripple counter 20 generates a binary count of eight (01000). This obtained binary signal is transmitted through the multi-bit output Q0–Q4 (five bits in this embodiment) to decoder 30. In the illustrated embodiment, although negative clock edges are illustrated, positive clock edges can be used. Further, counters which are level triggered may be used.

Referring again to FIG. 1, decoder 30 has a multi-bit input coupled to the multi-bit output of ripple counter 20 for receiving the binary signal, which is used in determining which one of registers 51–55 is to be loaded with data. Decoder 30 must be appropriately sized with counter 20. Decoder 30 includes plural output lines Z1, Z2, Z3, Z4 and Z5 functioning as address signals, each of which is respectively connected to a first input of one of AND gates 31–35. Each of AND gates 31–35 has a second input connected to the enable terminal 14. Decoder 30 may be a conventional binary one-of-thirty-two decoder, or any other possible type of decoder which can provide decoded outputs. The five-bit binary signal is interpreted as an address in decoder 30, and is used for selecting one of five address signal destinations Z1–Z5. That is, a combination of signals Q0–Q4 is uniquely converted to one address signal, which is output through only one of plural output lines Z1–Z5 and ultimately to one register as one load signal thru one of AND gates 31–35. The truth table of decoder 30 is given in Table 1. Each of the address output signals Z1–Z5 is connected to a respective one of five registers corresponding to registers 51–55 having different bit lengths, in order to select one register to be loaded. It should be noted here that merely a five-bit signal from counter 20 is sufficient to steer even a forty-eight-bit length register due to the fact that there are no redundant codes in Table 1.

TABLE 1

| INPUT | | | | | OUTPUT | | | | | REGISTER | |
|---|---|---|---|---|---|---|---|---|---|---|---|
| Q4 | Q3 | Q2 | Q1 | Q0 | Z5 | Z4 | Z3 | Z2 | Z1 | No. | LENGTH |
| 0 | 0 | 0 | 1 | 1 | 0 | 0 | 0 | 0 | 1 | 1 | 3 |
| 0 | 1 | 0 | 0 | 0 | 0 | 0 | 0 | 1 | 0 | 2 | 8 |
| 1 | 0 | 1 | 0 | 0 | 0 | 0 | 1 | 0 | 0 | 3 | 20 |
| 1 | 1 | 0 | 0 | 0 | 0 | 1 | 0 | 0 | 0 | 4 | 24 |
| 1 | 0 | 0 | 0 | 0 | 1 | 0 | 0 | 0 | 0 | 5 | 48 |

Serial-in, parallel-out shift register 40 has a clock input, labeled "Clk" for receiving clock pulses from clock terminal 12, and has a data input for receiving serial data from serial port 16. Shift register 40 further has a multi-bit data output coupled to each of registers 51–55, as explained herein below. Shift register 40 may be constructed by connecting a plurality of flip-flops. More specifically, in one form a plurality of identical flip-flops are cascaded in shift register 40 and controlled by common clock pulses. In such an embodiment, shift register 40 has forty-eight flip-flops for storing forty-eight-bit data, which corresponds to the maximum length register 55. Of course, any other shift register having any number of bits may be used according to various applications. Alternatively, multiple circuits functioning as peripheral devices may be cascaded together as is further illustrated in FIG. 1 by cascading an additional circuit 11 to circuit 10, assuming each circuit is substantially identical and each shift register, such as shift register 40, has a serial data output. Appropriate bit extensions of counter 20 and decoder 30 may be required for each of circuits 10 and 11. Each cascaded circuit may have a twenty-four-bit shift register or other lengths as needed.

After the enable signal transitions to a low logic level, the data stream from serial data port 16 is received within shift register 40 via its data input. Shift register 40 transfer, or shifts, the received serial data to the right by one bit position during the short period of time when the clock pulse edge rises. It takes n clock pulse time durations to receive all n bits of data, where n is an integer. For example, it takes eight clock pulses to acquire an eight-bit serial data as shown in FIG. 3. This eight-bit serial data is stored in the first, or left-most, eight bits (flip-flops) within the shift register 40. The left-most bit is, usually, the most significant bit (MSB) of the data stored in shift register 40. Thus, serially stored data is sent out to a multi-bit (48-bit in this embodiment) data bus, and is ready to be loaded in parallel into a selected register.

Referring back to FIG. 1, circuit 10 includes five registers 51, 52, 53, 54 and 55. However, it should be well understood that the number of registers may vary. The word "register" as used herein should be interpreted as referring to any type of storage element for data, usually constructed with flip-flops. For the following discussion, assume that circuit 10 is used as an LED driver where each of registers 51–55 operates with a predetermined function. In this embodiment, the first register 51 is a three-bit register, and functions as an instruction register. The second register 52 is an eight-bit register, and functions as a display brightness register. The next register 53 is a twenty-bit register and functions as a configuration register. The register 54 is a twenty-four bit register and functions as an LED driver blinking controller. A forty-eight bit register 55 functions as a display register. Each of registers 51–55 has a load input. Each of the output lines $Z_{1-5}$ of decoder 30 and the enable signal line are combined by each of the AND gates 31-35, respectively, whose outputs are connected to the respective load inputs of registers 51-55, as shown in FIG. 1. The address signal from decoder 30 can pass through a respective AND gate to the corresponding register only when the enable signal is at a high level. In this embodiment, the AND gates 31-35 are shown separately from decoder 30 but are a portion of the decoding function. Alternatively, decoder 30 may simply have an additional input (not shown) for receiving the enable signal instead of using AND gates 31-35, such that the decoder 30 output is inhibited when the received enable signal is low.

Each of registers 51-55 has a multi-bit data input coupled to at least a part of the multi-bit data output of shift register 40. For example, eight-bit register 52 has an eight-bit data input which is coupled to the first eight-bit data outputs of shift register 40.

In operation, assuming that an eight-bit serial data should be loaded into eight-bit register 52, ripple counter 20 counts eight clock pulses during the low level of the enable signal. And generates a binary count of eight (01000). This count signal is transmitted through the five-bit output Q0-Q4 to decoder 30. Decoder 30 converts the received signal (01000) to one address signal on the output line Z2. When the enable signal becomes high, this load signal on the line Z2 passes through AND gate 32 and reaches the load input of eight-bit register 52, and makes register 52 load data (see FIG. 3). Serial data from serial port 16 has already been transmitted to shift register 40 while the enable signal was at a low logic level. By the time the enable signal goes to a logic high level, shift register 40 has acquired all eight bits of the data. At the time the enable signal rises to a high logic level, the eight-bit data stored in register 40 is loaded in parallel into register 52. After some propagation delay, counter 20 is reset by the high enable line 14, thus making decoder 30 remove or release the load signal (see FIG. 3). Data has already been stored in register 52. Then, the next data loading process will start at the time of falling of the enable signal.

Figure 4:
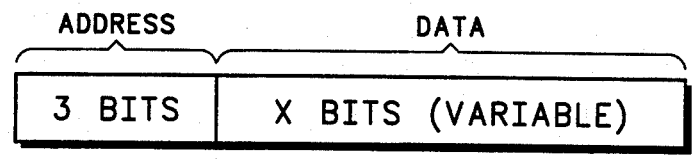
FIG. 4 illustrates an address and data bit stream of the prior art.
Figure 5:
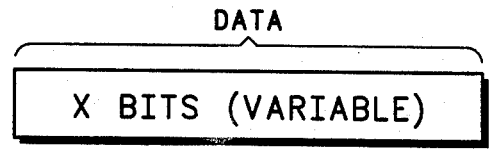
FIG. 5 illustrates a data bit stream according to the present invention.

In this manner, a circuit according to the present invention can positively access a predetermined register without using address bits. In the prior art, a three-bit address stream was required for designating one register among five registers, as shown in FIG. 4. Whereas, a circuit in accordance with the present invention eliminates address bits, as shown in FIG. 5, and therefore, can reduce bit stream length and shorten time required for data loading. Additionally, according to the present invention, plural registers and serial peripheral interfaces having different bit lengths can be easily designated and loaded with data by the same procedure using a single circuit. Therefore, external software programming which is typically used to provide the signals to circuit 10 is significantly simplified. The simplification results from the fact that if one byte of data (eight bits) needs to be transferred into one of registers 51-55, only one byte of data needs to be transferred because no address bits are required. Similarly, if two bytes of data need to be sent, then only two bytes of data need to be transferred.

While the present invention has been shown and described with reference to a particular embodiment thereof, various modifications and changes therein will be apparent to those skilled in the art and are within the spirit and scope of the present invention.

I claim:

1. An integrated circuit with a serial data port, for receiving serial data and loading such data into a predetermined one of several registers, comprising:
    counter means having a clock input for receiving clock pulses, a reset input for receiving an enable signal and a multi-bit output, said counter means counting the number of clock pulses received while said enable signal is in a first state, and generating a binary signal, corresponding to the number of clock pulses, on said multi-bit output;
    decoder means having a multi-bit input coupled to said multi-bit output of said counter means for receiving said binary signal, and plural outputs, said decoder means converting said binary signal to a load signal on only one of said plural outputs;
    a serial in, parallel-out shift register having a clock input for receiving said clock pulses, a data input and a multi-bit data output, said shift register receiving serial data through said data input, and producing parallel data on said multi-bit data output; and
    a plurality of registers, each having a load input for selectively receiving the load signal from a corresponding one of said plural outputs of said decoder means, and a multi-bit data input coupled to at least a part of said multi-bit data output of said shift register, whereby one of said registers selectively receives said load signal when said enable signal goes to a second state, and stores a corresponding part of said multi-bit data output from said shift register.

2. The integrated circuit according to claim 1 wherein said shift register further includes a serial data output which allows said integrated circuit to be cascaded with a second circuit for serially transferring data from the integrated circuit to the second circuit.

3. The integrated circuit according to claim 1 wherein said counter means is a ripple counter.

4. The integrated circuit according to claim 1 wherein said decoder means negates said load signal after a delay from when said enable signal transitions to said second state.

5. A method for receiving serial data for storage in a storage means and loading the data from the storage means into a predetermined one of several registers, comprising the steps of:
    receiving and counting a plurality of clock pulses during a time period when a control signal is in a first predetermined state;
    generating a binary signal corresponding to a counted number of clock pulses; and
    converting the binary signal to a plurality of load select signals equal in number to the number of registers, each of said load select signals for selectively allowing a predetermined one of the several registers to receive data in parallel from the storage means when the control signal is in a second predetermined state.

6. The method of claim 5 wherein said step of converting the binary signal to a plurality of load select signals comprises the steps of:
    converting the binary signal to a plurality of address signals, each address signal corresponding to a predetermined register; and
    using a predetermined logic function implemented by logic circuitry to selectively generate one of said load select signals by inputting both the control signal and each of the address signals to the logic circuitry.

* * * * *